United States Patent Office 3,359,279
Patented Dec. 19, 1967

3,359,279
POLYHALOCYCLOPENTADIENE-UNSATURATED
HETEROCYCLIC DIELS-ALDER ADDUCTS
Victor Mark, Norristown, Pa., assignor to Monsanto
Company, a corporation of Delaware
No Drawing. Filed Dec. 11, 1963, Ser. No. 329,909
10 Claims. (Cl. 260—332.5)

This application is a continuation-in-part of copending application Ser. No. 132,570, filed Aug. 21, 1961, now abandoned, which in turn is a continuation-in-part of application Ser. No. 44,890.

This invention relates to new chemical compounds and to methods of their synthesis. More specifically, the invention is directed to new Diels-Alder type adducts of unusual value. The preparation involves the adduction of substituted halocyclopentadienes and certain types of olefins.

It is well known that hexachlorocyclopentadiene can be reacted with olefins to form adducts which are toxic to living organisms. Although many of these are very toxic to most insects, they are dangerous to use because of their mammalian toxicity. In the use of these compounds insect toxicity is frequently sacrificed in favor of safety to operating personnel.

It is a fundamental purpose of this invention to provide new biological toxicants with greatly reduced mammalian toxicity without serious loss of toxicity to microorganisms. A further purpose is to make available active insecticides, fungicides, and herbicides which are relatively safe to use. Other purposes will be apparent from the following description of the preparation and use of the new biologically active compounds.

In said copending applications Ser. Nos. 44,890 and 132,570 there is described a family of halocyclopentadienes which have one or more organic radicals substituted on the cyclopentadiene ring at least one of which is in the allylic position (i.e., on the carbon atom which is not involved in an unsaturated bond). The novel method by which the new compounds are prepared is also claimed therein. These compounds are used in the practice of the present invention and are in accordance therewith adducted to olefins having certain structural configurations.

It is well known that the Diels-Alder adduction involves the reaction of a diene with an unsaturated compound. It is further known that hexachlorocyclopentadienes react in this manner with a wide variety of unsaturated compounds. In accordance with the present invention it has been found that compounds of quite different and valuable properties are prepared by the use of the substituted hexahalocyclopentadienes described in the earlier filed application.

These reactants are represented by the structural formula

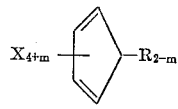

wherein the X's represent halogen atoms of the group consisting of chlorine, bromine, fluorine and iodine; subscript $m$ being an integer from zero (0) to one (1); and wherein each R is a radical selected from the class consisting of hydrocarbon radicals having up to 20 carbon atoms selected from the group consisting of alkyl radicals such as methyl, ethyl, n-propyl, isopropyl, butyl, isobutyl, sec-butyl, tert-butyl, hexyl, 2-ethylhexyl, decyl, dodecyl and octadecyl radicals; alkenyl radicals, such as vinyl, allyl, methallyl, crotyl, 2-hexenyl, 10-undecenyl and 2-hexadecenyl radicals; the alkynyl radicals, such as ethynyl, propargyl, 2-butynyl, 8-decynyl and 2-octa- decynyl radicals; the cycloalkyl radicals, such as cyclopropyl, cyclobutyl, cyclopentyl, cyclohexyl, cyclooctyl, norbornyl, triyclo[2,2,1,0$^{2,6}$]-hept-3-yl and cyclopropylmethyl radicals; the cycloalkenyl radicals, such as 3-cyclopentenyl, 2-cyclohevenyl, 2-cycloheptenyl, cyclooctenyl, 2-norbornen-5-yl, and nopyl radicals; the aryl radicals, such as phenyl, biphenylyl, naphthyl, triphenylmethyl and anthracyl radicals; the alkaryl radicals, such as p-tolyl, 2,4-dimethylphenyl, 7 - methyl - 1 - naphthyl, p-ethylbi-phenylyl and 10-ethyl-9-anthracyl radicals; the alkenaryl radicals, such as p-allylphenyl, m-methallylphenyl, p-hexadecenylphenyl and the corresponding substituted naphthyl and biphenyl radicals; the alkyl substituted cycloalkyl radicals, such as 4-dodecylcyclohexyl and the 2-ethyl-cyclopentyl radicals; the alkenyl substituted cycloalkyl radicals, such as 2-allylcyclopentyl; the alkynyl substituted cycloalkyl radicals, such as 4-propargylcyclohexyl, ethynylcyclopentyl; the alkyl cycloalkenyl radicals, such as 3-ethyl-2-cycloheptenyl; the alkenylcycloalkenyl radicals, such as 4-allyl-2-cyclohexenyl and 4-vinyl-2-cyclohexenyl; the alkynylcycloalkenyl radicals, such as 4-propargyl-2-cyclohexenyl; the aralkyl radicals, such as benzyl, 2-phenethyl and indenyl radicals; the aralkenyl radicals, such as cinnamyl and styryl radicals; the aralkynyl radicals, such as 3-phenylpropargyl; the cycloalkyl substituted alkyl, such as 3-cyclohexylpropyl; the cycloalkyl substituted alkenyl radicals, such as 3-cycloheptylallyl, and 3-cyclopentylmethallyl radicals; the cycloalkyl substituted alkynyl radicals, such as 3-cyclooctylpropargyl and 10-cyclohexyldecynyl radicals; the cycloalkenylalkyl radical, such as 2(2-cyclopentenyl)ethyl and 2(1-cyclohexenyl)methyl; the cycloalkenyl substituted alkenyl radicals, such as 4(1-cyclopentenyl)-2-butenyl and the 2(1-cyclohexenyl)vinyl radicals; the cycloalkenyl substituted alkynyl radicals, such as the 3(2-cyclohexenyl) propargyl radical; the alkyl substituted aralkyl radicals, such as p-ethylbenzyl; the alkenyl substituted aralkyl radicals, such as p-allylphenethyl; the alkynyl substituted aralkyl radicals, such as 10(p-propargylphenyl)decyl; the alkyl substituted aralkenyl radicals, such as 2,4-dimethyl-cinnamyl; the alkenyl substituted aralkenyl radicals, such as the p-allylstryryl radicals; and the said hydrocarbon radicals containing substituents of the group consisting of chlorine, as in 2-chloroethyl and p-chlorobenzyl; bromine, as in 4-bromobutyl; fluorine, as in 2,2,2-trifluoro-ethyl; iodine, such as in 2,4,6-tri-iodobenzyl; alkoxy, such as in 2-methoxyethyl and p-isopropoxybenzyl; aryloxy, such as in 2-phenoxyethyl and p-methoxybenzyl; nitro, such as in o-nitrobenzyl; cyano, such as in 2-cyano-ethyl; thiocyano, such as in 3-thiocyanoallyl; isocyano, such as in m-isocyanophenyl; mercapto, such as in p-mer-captobenzyl; hydroxyl, such as in 3-hydroxypropyl; acyloxy, such as o-acetyloxybenzyl; isothiocyano, such as in 2-isothiocyanoethyl; acyl, such as in p-acetylphenyl; hydrocarbonoxy carbonyl, such as the methyl ester of p-carboxybenzyl; the alkylthio, such as 2-methylthio-propyl; arylthio, such as in phenylthiomethyl; aralkylthio, such as in 2-benzylthioethyl; amino, such as in 2-amino-ethyl; hydrocarbon amino, such as in 2-dimethylamino-ethyl; hydrocarbon sulfonyl, such as in 2-isopropylsul-fonylethyl; hydrocarbon sulfinyl, such as in 2-phenylsul-finylethyl; furyl, such as in furfuryl; thienyl, such as in thenyl; pyridyl, such as in 2-pyridylethyl; piperidyl, such as in 4-piperidyl; glycidyl, such as in glycidyl and glycidylmethyl; morpholyl, such as in 2(2-morpholyl) ethyl; tetrahydrofuryl, such as in tetrahydrofurfuryl; dihydrofuryl, such as dihydrofurfuryl; tetrahydrothienyl, such as tetrahydrothenyl; dihydrothenyl, such as in dihy-drothenyl; the hydrocarbon and acyl groups of the said substituents having up to 20 carbon atoms.

This invention involves the adduction of the above identified polyhalocyclopentadienes with organic compounds containing carbon to carbon unsaturated bonds hereinafter designated as the dienophiles, said polyhalocyclopentadienes having at least one organic radical on the allylic carbon atom (one that is not involved in a carbon to carbon double bond). The halogen substituents on the polyhalocyclopentadiene may be chlorine, bromine, fluorine, or iodine and may be the same or different halogen atoms on the cyclopentadiene molecule.

The conditions of reaction between the described cyclopentadienes and the dienophiles are dependent upon the nature and relative reactivity of the reactants. The reaction may be conducted at room temperature and atmospheric pressures, but a wide range of conditions are practicable, usually higher than room temperatures and often higher than atmospheric pressures are required with most reactants.

When the dienophile is very reactive, the simple mixing of the reactants at or below room temperature initiates the reaction. Cooling is then necessary to keep the reactants in liquid form and within the temperature range desired for optimum conversion. It is convenient often to confine the reaction mixture in a closed system to prevent the escape of the volatile component. The use of closed vessels (autoclaves) is especially desirable when the dienophile is gaseous at room temperature. Furthermore, when the reaction partners do not readily interact, the application of heating may be desirable to increase the rate of adduction; this often is done in autoclaves and under autogenous pressures.

The reaction often is conducted in the presence of appropriate solvents. These may have multiple beneficial effects. For instance, a liquid with good solvent properties for the less soluble component might increase the effective concentration, and the rate of the reaction. A liquid often is used when an internal coolant is needed to keep the temperature within a narrow range. By choosing a liquid with a boiling point close to the temperature required for the reaction, the danger of overheating is greatly reduced because the refluxing liquid dissipates the heat of the reaction. Suitable inert solvents are hydrocarbons (benzene, toluene), ethers, halogenated solvents (chlorobenzene) and the like.

The use of catalysts is often desirable in order to speed up the rate of conversion of sluggish reactants. Lewis acids, such as those used in the Friedel-Crafts reaction, are especially useful catalysts. These include $AlCl_3$, $BF_3$, $SbCl_3$, $FeCl_3$, etc.

Further details in the preparation and use of the new compounds are set forth hereinafter in specific examples.

Heterocyclic unsaturated compounds may also be adducted to the unconjugated halocyclopentadienes in accordance with this invention, thereby synthesizing compounds of the structure

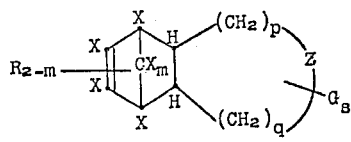

wherein R and X are as defined above; wherein G is a radical selected from the class consisting of $-NO_2$, Cl, Br, alkyl having up to four carbon atoms, alkoxy having up to four carbon atoms, and alkylthio having up to four carbon atoms; wherein $m$ is an integer from zero to one; wherein $p$ and $q$ are each integers from zero to eight; wherein $s$ is an integer from zero to four; and wherein Z is a divalent radical of the group consisting of

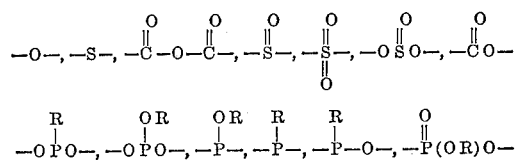

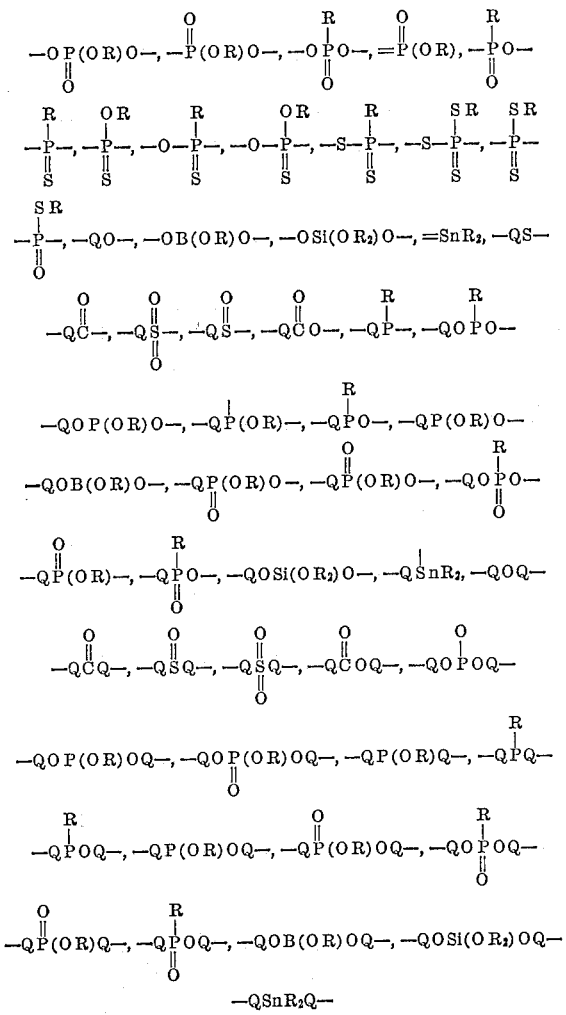

and $-q-$; wherein Q is a divalent radical of the group consisting of hydrocarbons having up to 6 carbon atoms and the above described G substituted hydrocarbon radicals; $-WCH=CH_2-$,

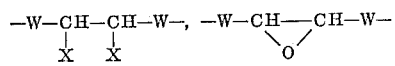

$-W-CX=CH-W-$, $-W-CX=CX-W-$, wherein W is a divalent radical selected from the group consisting of $-O-$, $-S-$,

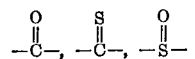

and

Dienophiles suitable for the preparation of this type of compound by adduction with halocyclopentadienes having at least a single R substituent are furan, 2,5-dihydrofuran, 2,3-dihydrofuran, 2-chlorofuran, thiophene, 2,5-dihydrothiophene, 2,3-dihydrothiophene, 2-chlorothiophene, cyclobutenone, 2,methylfuran, maleic anhydride, chloromaleic anhydride, itaconic anhydride, citraconic anhydride, quinone, phenylbenzoquinone, toluquinone, 3,6-epoxy-4-cyclohexene dicarboxylic anhydride, 1,4-naphthoquinone, 2,3-dichlorobenzoquinone, dioxene, thioxene, dioxadiene, oxathiadiene, 2,3-dichloro-1,4-dioxadiene, cis-2-butene-1,4-diol cyclic sulfite, cis-2-butene-1,4-diol cyclic phosphite, cis-2-butene-1,4-diol cyclic carbonate, 4-pyrone, vinylene carbonate.

A useful class of compounds of the above described type are those of the general formula

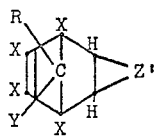

wherein X is a halogen of the group consisting of chlorine and bromine; wherein R is a radical of the class consisting of alkyl radicals of up to eight carbon atoms, alkenyl radicals of up to eight carbon atoms, chloroalkyl radicals up to eight carbon atoms, having the alpha carbon atom in a —$CH_2$— group, and oxaalkyl radicals of up to eight carbon atoms; wherein Y is selected from the class X, R and hydrogen; and wherein Z' is a hetero atom or atomic grouping selected from the class consisting of $CH_2$—O—$CH_2$—, —$CH_2$S—$CH_2$—,

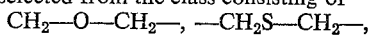

—O—CH=CH—, —S—CH=CH, and

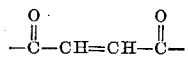

The compounds are the adducts of alkylated (one or two substituents) halocyclopentadienes and dihydrofuran, dihydrothiophene, quinone, maleic anhydride, furan and thiophene.

Further details of the new compounds and methods for their preparation are set forth in the following examples, which should not be construed as limitations on the scope of the invention.

*Example 1*

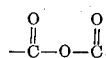

Pentachloro - 5 - ethylcyclopentadiene, 26.7 g. (0.10 mole) was charged to a 3-neck flask, equipped with stirrer, thermometer, reflux condenser and a dropping funnel that had an extended stem reaching into the liquid suitable for subsurface introduction. The liquid was heated up to 160° C.; with good stirring 7.7 g. (0.11 mole) of 2,5-dihydrofuran was introduced at such a rate as to keep the temperature of the reaction mixture between 150° C. and 195° C. After the addition was completed, which required 20 hours, the reaction product was recrystallized from ethanol. The Diels-Alder product, 4,5,6,7,8-pentachloro-8-ethyl-1,3,3a,4,7,7a - hexahydro - 4,7-methanoisobenzofuran, was obtained in 50% conversion and in form of white crystals that melted between 156° C. and 172° C.

*Analysis.*—Calculated for $C_{11}H_{11}Cl_5O$: Cl, 52.69. Found: 52.94.

*Example 2*

When the reactants of Example 1 were charged to a rotating autoclave fitted with a glass liner and the heating was carried out at 150° C. to 160° C. for 5 hours, under autogenous pressure, the adduct described in the preceding example was obtained in 90% yield.

*Example 3*

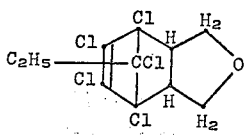

When pentachloro-5-methylcyclopentadiene was substituted for the ethyl homolog of Examples 1 and 2 the corresponding Diels-Alder adduct, 4,5,6,7,8-pentachloro-1,3,3a,4,7,7a-hexahydro - 8 - methyl-4,7-methanoisobenzofuran was obtained in greater than 90% yield in form of white crystals, M.P. 149° C. to 155° C.

*Analysis.*—Calculated for $C_{10}H_9Cl_5O$: Cl, 54.98. Found: Cl, 54.93.

*Example 4*

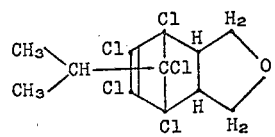

A mixture of 56.1 g. (0.20 mole) of pentachloro-5-isopropylcyclopentadiene and 14.2 g. (0.20 mole) of 2,5-dihydrofuran was charged to a 250 ml. pressure bottle and heated for a period of 6 hours in an oil bath kept at 150° C. Workup yielded 4,5,6,7,8 - pentachloro-1,3,3a,4,7,7a-hexahydro-8-isopropyl-4,7 - methanoisobenzofuran, M.P. 141° C. to 146° C. in 86% yield (27% conversion).

*Analysis.*—Calculated for $C_{12}H_{13}Cl_5O$: Cl, 50.58. Found: Cl, 50.30.

*Example 5*

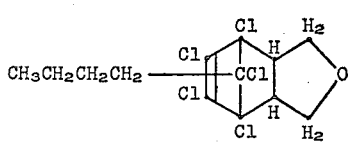

The procedure of Example 4 was repeated, except that 5-butylpentachlorocyclopentadiene was substituted for the isopropyl homolog. 8-butyl-4,5,6,7,8-pentachloro-1,3,3a,4,7,7a - hexahydro-4,7-methanoisobenzofuran, B.P. 129° C. at 0.37 mm. pressure, $n_D^{25}$ 1.5379, was obtained in 65% yield.

*Example 6*

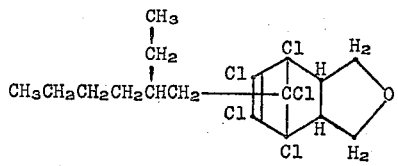

Repetition of the procedure of Example 4 with pentachloro-5(2-ethylhexyl)cyclopentadiene being substituted for the isopropyl homolog yielded 4,5,6,7,8-pentachloro-8-(2-ethylhexyl) - 1,3,3a,4,7,7a - hexahydro - 4,7 - methanoisobenzofuran, B.P. 159° C. at 0.31 mm., $n_D^{25}$ 1.5271, in 69% yield.

*Example 7*

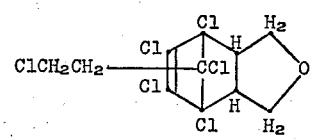

Repeating the procedure of Example 4 with pentachloro-5(2-chloroethyl)cyclopentadiene and 2,5- dihydrofuran resulted in the formation of 4,5,6,7,8-pentachloro-8(2-chloroethyl)-1,3,3a,4,7,7a-hexahydro - 4,7 - methanoisobenzofuran, B.P. 142° C. at 0.29 mm., $n_D^{25}$ 1.5628.

*Analysis.*—Calculated for $C_{11}H_{10}Cl_6O$: Cl, 57.36. Found: Cl, 57.23.

*Example 8*

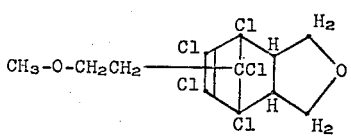

Repeating the procedure of Example 4 with pentachloro-5(2-methoxyethyl)cyclopentadiene and 2,5 - dihydrofuran yielded 4,5,6,7,8-pentachloro-1,3,3a,4,7,7a-hexahydro-8(2 - methoxyethyl) - 4,7 - methanoisobenzofuran, B.P. 132° C. at 0.18 mm., $n_D^{25}$ 1.5446, in 80% yield.

*Example 9*

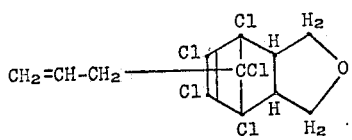

When the procedure of Example 4 was repeated using 5-allylpentachlorocyclopentadiene and 2,5 - dihydrofuran as the reactants, 8-allyl-4,5,6,7,8-pentachloro-1,3,3a,4,7, 7a-hexahydro-4,7-methanoisobenzofuran, having a boiling point of 113° C. at 0.25 mm. pressure and a melting point of 114–118° C. was obtained in 53% yield.

*Example 10*

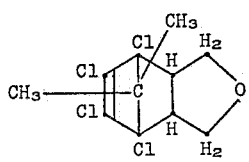

A mixure of tetrachloro-5,5-dimethylcyclopentadiene and 2,5-dihydrofuran was heated as described in Example 4. The Diels-Alder adduct, 4,5,6,7-tetrachloro-1,3,3a,4,7, 7a,-hexahydro - 8,8-dimethyl-4,7 - methanoisobenzofuran, M.P. 145–153° C. was obtained in 84% yield.

*Analysis.*—Calculated for $C_{11}H_{12}Cl_4O$: Cl, 46.96. Found: Cl, 47.57.

*Example 11*

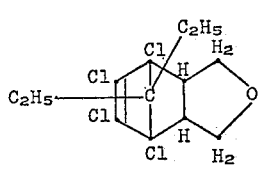

The Diels-Alder reaction between tetrachloro-5,5-diethylcyclopentadiene and 2,5-dihydrofuran was carried out by the procedure of Example 4. 4,5,6,7-tetrachloro-8,8-diethyl-1,3,3a,4,7,7a-hexahydro - 4,7-methanoisobenzofuran, M.P. 108–116° C., was obtained in 50% yield.

*Example 12*

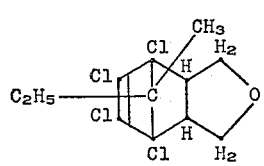

A mixture of tetrachloro-5-ethyl-5-methylcyclopentadiene and 2,5-dihydrofuran was treated by the prodecure of Example 4. 4,5,6,7-tetrachloro-8-ethyl - 1,3,3a,4,7,7a-hexahydro-8-methyl-4,7-methanoisobenzofuran, M.P. 130 to 148° C. was obtained in 71% yield.

*Example 13*

The procedure of Example 1 was repeated except that 5-methylpentabromocyclopentadiene (M.P. 61° C.) was substituted for pentachloro - 5 - ethylcyclopentadiene. Workup of the dark reaction mixture yielded a crystalline adduct of the following structure:

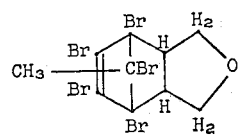

in form of pale yellow crystals.

*Example 14*

The procedure of Example 4 is repeated using 2-chlorothiophene in place of dihydrofuran. A substantial amount of compound as follows is isolated:

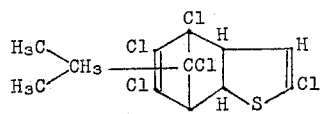

*Example 15*

By using the procedure of Example 3 except substituting 2,5-dihydrothiophene for dihydrofuran a compound is prepared of the following structure

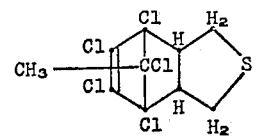

The adduct is thus 4,5,6,7,8-pentachloro-1,3,3a,4,7,7a-hexahydro-8-methyl-4,7 - methanobenzo-[c]-thiophene, a low melting solid, valuable intermediate for the synthesis of insecticides.

*Example 16*

The adduction of 5-n-butyl-1,2,3,4,5-pentachlorocyclopentadiene with 1-benzothiophene is effected by the above described procedure. By this reaction the compound of the following structure is recovered from the reaction mixture:

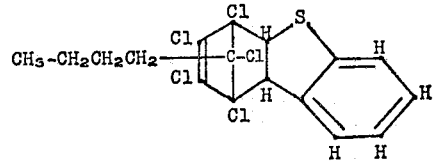

*Example 17*

By using the procedure of the above examples, the adduct of 1,2,3,4,5 - pentachloro-5-(2 - chloroethyl)cyclopentadiene and maleic anhydride is obtained which has the structure

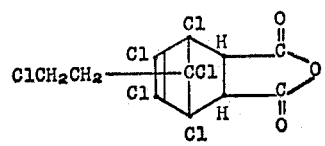

*Example 18*

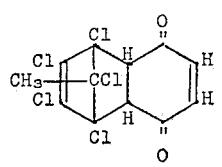

A mixture consisting of 21 g. (0.0835 mole) of pentachloro-5-methylcyclopentadiene, 9.0 g. (0.0835 mole) of p-benzoquinone and 35 ml. of mixed xylene was refluxed at 149° C. for a period of 3.5 hours. Concentration of the solution yielded 5,6,7,8,9 - pentachloro-4a,5,8,8a-tetrahydro-9-methyl-1,4-naphthoquinone as a crystalline mass in 92% yield, that, after recrystallization from benzene yielded pale yellow crystals having a melting point of 192 to 202° C.

*Analysis.*—Calculated for $C_{12}H_7Cl_5O_2$: Cl, 49.18. Found: Cl, 48.30.

*Example 19*

The adduct of 1,2,3,4,5-pentachloro-5-allyl cyclopentadiene and maleic anhydride was prepared by the procedure of Example 1.

Example 20

The adduct of 1,2,3,4,5-pentachloro-5-methyl cyclopentadiene and furan was adducted in equimolar proportions to produce a compound of the structure

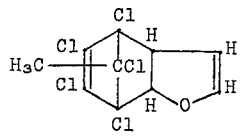

The above examples represent preferred modifications of the invention and these will suggest further variations to one skilled in the art. Similarly, the following claims are directed to more useful modifications of the invention, but other compounds of the claims defined broadly will have similar utility.

What is claimed is:

1. The compound 4,5,6,7-tetrachloro-1,3,3a,4,7,7a-hexahydro-8,8-dimethyl-4,7-methanoisobenzofuran.
2. A compound of the formula

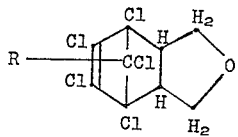

wherein R is alkyl of up to eight carbon atoms.
3. A compound of the formula

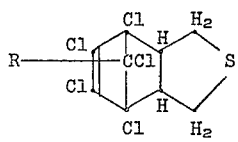

wherein R is alkyl of up to eight carbon atoms.

4. A compound of the formula

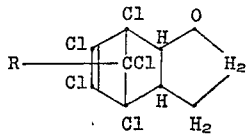

wherein R is alkyl of up to eight carbon atoms.
5. A compound of the formula

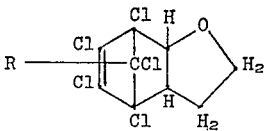

wherein R is alkyl of up to twenty carbon atoms.
6. A compound of the formula

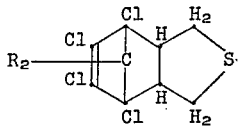

wherein R is alkyl of up to eight carbon atoms.

7. The compound 4,5,6,7,8-pentachloro-8-ethyl-1,3,3a,-4,7,7a-hexahydro-4,7-methanoisobenzofuran.
8. The compound 4,5,6,7,8 - pentachloro-1,3,3a,4,7,7a-hexahydro-8-methyl-4,7-methanoisobenzofuran.
9. The compound 4,5,6,7-tetrachloro-8,8-diethyl-1,3,3a-4,7,7a-hexahydro-4,7-methanoisobenzofuran.
10. The compound 4,5,6,7,8-pentachloro-1,3,3a,4,7,7a-hexahydro-8-methyl-4,7-methanobenzo-[c]-thiophene.

References Cited

FOREIGN PATENTS 1,091,123  10/1960  Germany.

JAMES A. PATTEN, *Primary Examiner.*